United States Patent
Porter

(10) Patent No.: US 8,929,047 B2
(45) Date of Patent: Jan. 6, 2015

(54) TRANSIENT PROTECTION AT A LINE INTERFACE

(75) Inventor: Guy Michael Porter, Santa Rosa, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 1784 days.

(21) Appl. No.: 12/004,971

(22) Filed: Dec. 24, 2007

(65) Prior Publication Data

US 2009/0161282 A1   Jun. 25, 2009

(51) Int. Cl.
*H02H 3/22*   (2006.01)
*H04M 1/74*   (2006.01)

(52) U.S. Cl.
CPC .................................. *H04M 1/745* (2013.01)
USPC ........................................... 361/111; 361/56

(58) Field of Classification Search
USPC ................................................... 361/56, 111
See application file for complete search history.

(56) References Cited

U.S. PATENT DOCUMENTS

| | | | | |
|---|---|---|---|---|
| 4,760,433 | A * | 7/1988 | Young et al. | 257/357 |
| 5,978,192 | A * | 11/1999 | Young et al. | 361/56 |
| 6,337,787 | B2 * | 1/2002 | Tang | 361/56 |
| 7,027,277 | B1 * | 4/2006 | Vashchenko et al. | 361/56 |
| 7,529,070 | B2 * | 5/2009 | Bhattacharya et al. | 361/56 |
| 2003/0059997 | A1 * | 3/2003 | Bedarida et al. | 438/200 |
| 2005/0270712 | A1 * | 12/2005 | Huang et al. | 361/90 |
| 2007/0127173 | A1 * | 6/2007 | Chang | 361/56 |

* cited by examiner

*Primary Examiner* — Scott Bauer
(74) *Attorney, Agent, or Firm* — RGIP LLC

(57) ABSTRACT

A protection circuit provides transient protection to a solid state circuit of a line interface for wired telecommunications media at a voltage level below the power supply of the solid state circuit and prevents transient currents from entering the power supply distribution where they might cause damage to the protected interface and other circuits. The protection circuit uses a MOSFET, the gate of which is provided with a bias derived from a power supply of the solid state circuit being protected. The bias causes the MOSFET to be always on such that the MOSFET provides an immediate and high transconductance path to ground for transient currents from the line interface.

17 Claims, 3 Drawing Sheets

TRANSIENT PROTECTION AT A LINE INTERFACE

FIELD OF THE INVENTION

This invention relates to circuit protection measures and more particularly to circuit protection measures for wired communications transmission media.

BACKGROUND OF THE INVENTION

Solid state circuits that interface with wired communications transmission media typically require protection from transient energy appearing at the interface. This protection typically involves voltage clamping and current limiting elements. Voltage clamps that track the power supply voltage of the interface circuitry are often required. One of the challenges of using this type of protection is that some of the transient energy may find its way into the power supply distribution and cause collateral damage. Transient voltage clamping requirements become more critical for circuits with low impedance interfaces since series current limiting resistors have a detrimental affect on the interface performance. In some cases, protection at a voltage level that is below the level of supply voltage(s) and that tracks any change in voltage may provide improved protection and permit the selection of lower series resistance between the clamp and the protected circuit. Protection that tracks supply voltage changes is especially important when the supply voltage is not regulated as is the case in many telecommunications applications utilizing battery reserve.

Two methods are typically employed to clamp transient voltages to a level that tracks the protected circuit power supply voltage. The simplest method is to use diodes between the line interface and the power supply that are forward biased when transients exceed the circuit supply voltage by at least one diode drop. A problem with this solution is that transient currents are diverted to the supply voltage rail. Power supplies are typically only designed to source current, and transient energy conducted to the power supply rail must be dissipated in the circuitry powered by the supply. A second method is to use a triggered thyristor device that diverts current to ground when transient voltages exceed the supply voltage by a few diode drops. Currents required to trigger this type of device are conducted to the power supply rail. This type of a device results in much lower currents at the power supply interface, but these currents can still be significant when the power supply is lightly loaded.

With these protection methods, transient voltages appearing at the line interface will always exceed the supply voltage. Resistors are usually required between the protection device and the protected circuit to limit transient currents in the interface circuitry. The value of these resistors is constrained by the protection voltage and can have a detrimental affect on the circuit performance.

This type of protection is least effective when transient energy finds its way to the supply rails through multiple interfaces or when the transient is repetitive as is the case with an AC power contact. Currents in the protection diodes or in trigger circuits of protective clamp devices can cause the supply voltage to be pumped up, especially when the power supply is lightly loaded. Some transient events, such as an AC power fault, can result in repetitive transient currents that must be absorbed by the power supply. If the cumulative transient current absorbed by the supply exceeds the load, the supply voltage and tracking protection clamp voltage both are increased and the protected load and possibly other circuitry powered by the supply can be damaged as a result.

Transient or foreign currents find their way into the power supply circuits through multiple paths when the protection clamping voltage exceeds the supply voltage. One of these paths can be the integrated circuit that the protection circuitry is designed to protect. When currents flow through IC interfaces to the supply voltage, causing the voltage at these interfaces to exceed the supply, latch up or destructive conditions may result. If transient voltages are clamped to levels below the supply these latch up conditions can be avoided.

What is required is an alternative protection circuit that will divert transient energy away from the interface circuit and its power source.

SUMMARY OF THE INVENTION

In accordance with one embodiment of the disclosure, there is provided a protection circuit for protecting at least one solid state circuit at a line interface, the protection circuit comprising at least one transistor; and at least one bias supply for supplying a bias current to said at least one transistor; wherein the supplied bias current is at least a current required to operate said transistor.

In accordance with one embodiment of the disclosure, there is provided a method for protecting at least one solid state circuit at a line interface, the method comprising providing at least one transistor; providing a bias to at least one gate of said at least one transistor; receiving a current transient from said line interface; and conducting said current transient to ground through said at least one transistor.

BRIEF DESCRIPTION OF THE DRAWINGS

Embodiments of the disclosure will now be described, by way of example only, with reference to the accompanying drawings in which.

DETAILED DESCRIPTION OF THE INVENTION

Figure 1:
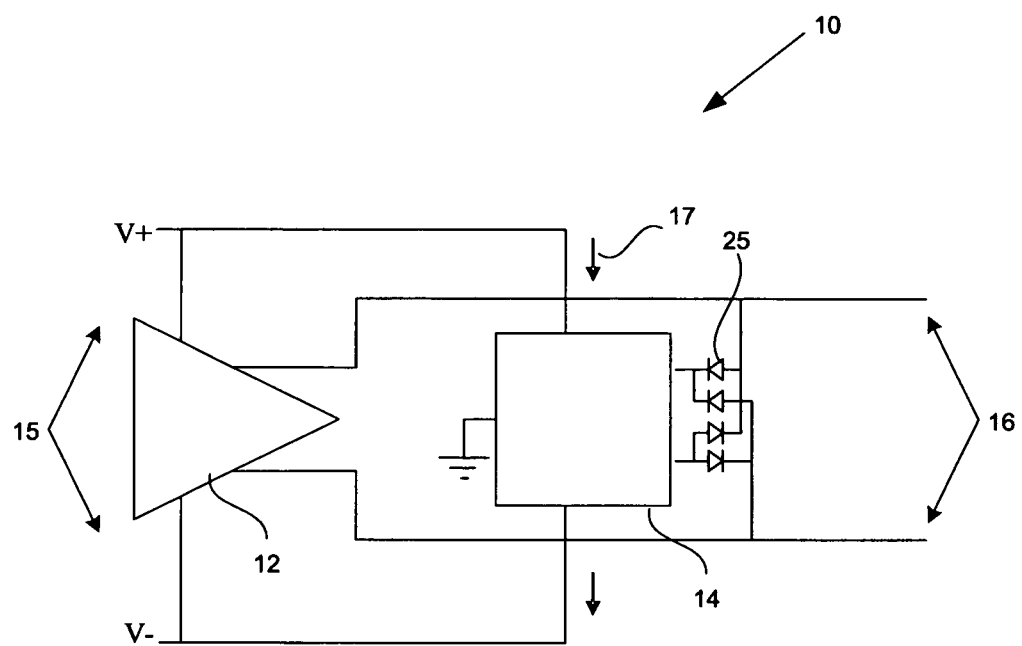
FIG. 1 schematically represents a circuit for providing transient protection at a line interface.

With reference to FIG. 1, there is shown a circuit 10 in accordance with an embodiment of the disclosure. The circuit 10 provides a line interface circuit 12, for example a solid state circuit, that is to be protected from a line interface 16. Disposed between the line interface circuit 12 and the line interface 16 is a protection clamp 14. The protection clamp 14 can be used to limit the voltage appearing at the interface circuit 12 to a voltage below the supply voltage(s) 15 of the interface circuit 12. The protection clamp 14 can also isolate the line interface circuit from transient energy coming through the line interface. The protection clamp 14 is provided with a bias current 17 derived from the power supply 15 of the line interface circuit 12 which enables the protection clamp to react quickly to transients.

The protection clamp 14 is thus an active circuit that consumes a small bias current 17 from the supply voltage 15 of the circuit to be protected 12 and provides a low impedance path to ground for transient energy. The bias current 17 is used to establish a protection voltage level that is below the supply voltage. Transient voltages appearing at the interface are clamped through diodes by the low impedance of the protection circuit.

Figure 2:
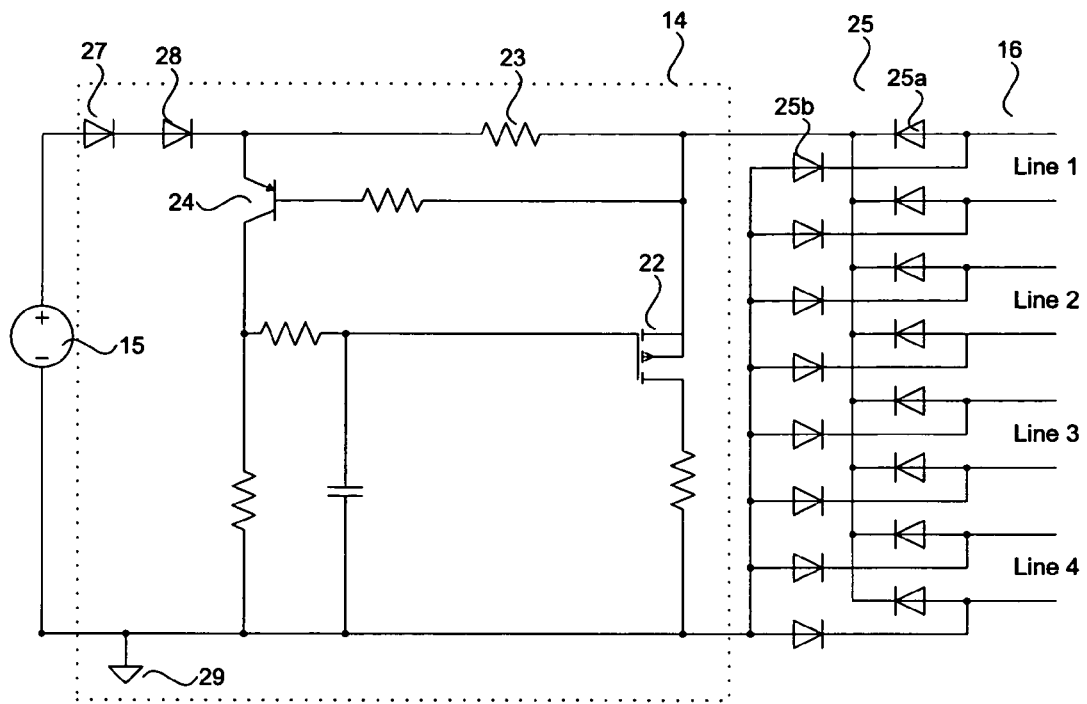
FIG. 2 schematically represents a circuit diagram for providing transient protection.

A simplified detailed implementation will now be described with reference to FIG. 2. In the depicted implementation, the line interface 16 is represented by four lines. However, it will be apparent to the person skilled in the art that the line interface 16 may have any number of lines. A protection clamp 14 interfaces with the line interface 16 through a series of diodes 25.

At the core of the protection clamp 14 is a transistor 22 such as a Metal Oxide Semiconductor Field Effect Transistor (MOSFET) or, more generically, an Insulated Gate Field Effect Transistor (IGFET). In operation, the MOSFET 22 is biased on with a small current. While the bias current may be derived from any suitable means, such as an independent supply, in one embodiment, the bias current is derived from the power supply 15 of the circuit to be protected, for reasons discussed below. A second transistor 24 regulates the bias current based on the value of resistor 23. The purpose of the bias current is to keep the gate-source voltage of the MOSFET 22 at the gate threshold thus reducing the time required for the transistor to respond to a transient condition. When a transient is applied to the circuit, the gate-source voltage will increase slightly, turning the MOSFET on harder and increasing the conductance to ground 29. The clamp has very low impedance during a transient event due to the high transconductance of the MOSFET 22. The circuit 20 therefore has advantage over prior art circuits by ensuring that transient energy is conducted to ground 29, rather than to the power supply 15.

Deriving the bias current from the voltage supply 15 of the protected circuit allows the clamp voltage to be set below the voltage of the supply 15 by using one or more diodes 27, 28 in series in the bias current path. In the embodiment depicted in FIG. 2, two diodes 27, 28 are used. The clamp voltage in this example is thus two diode drops below the power supply voltage 15 (Vbe(Transistor 24)+V(Diode 27)+V(Diode 28)−V(Diode 25a). The MOSFET 22 source is biased three voltage drops below the power supply voltage 15. While two diodes 27, 28 are shown, a single diode may be used. Alternatively, one of the diodes 27, 28 in series with the supply can be replaced with a zener diode, or more diodes can be used, if a lower clamp voltage is desired.

In addition to setting the clamp voltage, the diodes 27, 28 also provide isolation between the clamp circuit and the power source.

Figure 3:
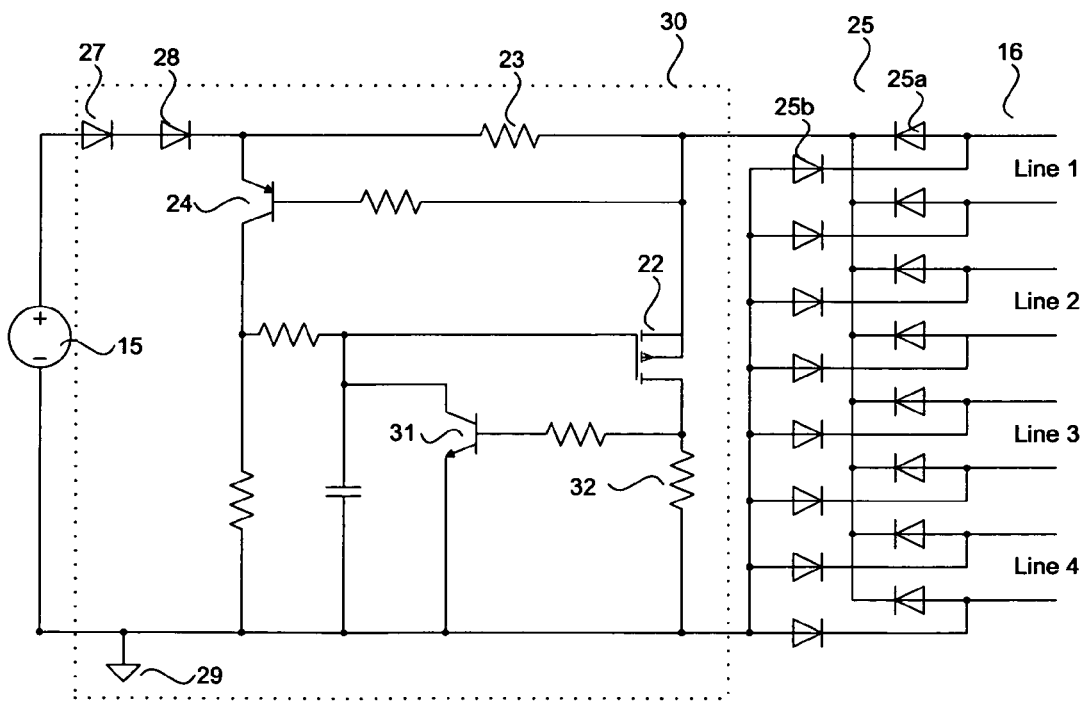
FIG. 3 represents a modification of the circuit of FIG. 2.

With reference now to FIG. 3, there is shown a modified circuit 30 in which like numerals indicate like parts. The circuit 30 has been modified by the addition of transistor 31 which connects to the gate of MOSFET 22. The gate of transistor 31 is derived from between the drain of MOSFET 22 and a resistor 32 that is placed between the drain of MOSFET 22 and ground 29. Transistor 31 turns the MOSFET 22 on hard during high transient current events, i.e. for high peak currents. This avalanche trip current is set by the value of resistor 32.

Some line interface circuits require protection of this type only for a single polarity and a diode to ground provides sufficient protection for the opposite polarity. The circuits 20, 30 depicted in FIGS. 2 and 3 respectively provides positive polarity protection by ensuring that positive transients pass through diodes e.g. diode 25a, while negative voltage transients pass through opposite diodes, e.g. diode 25b and are thus clamped to ground 29. The person skilled in the art will readily understand that a negative clamp can be produced using the circuits 20, 30 depicted in FIGS. 2 and 3 by substituting complimentary components.

Figure 4:
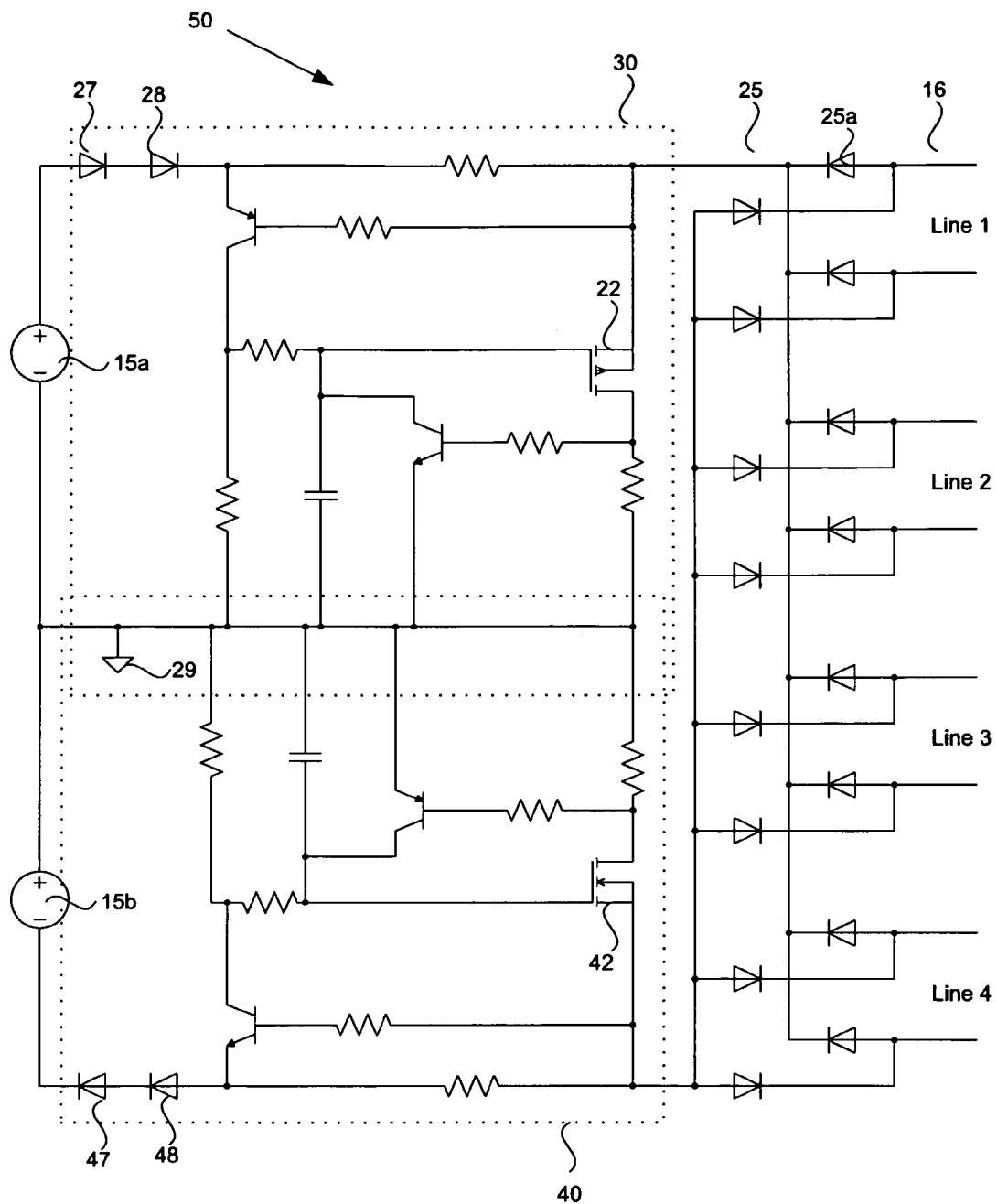
FIG. 4 represents a circuit diagram for providing dual-polarity transient protection.

A circuit providing both positive and negative polarity protection is shown in FIG. 4. The circuit 50 includes the circuit 30 described above with reference to FIG. 3 and an additional circuit 40 which is complementary to the circuit 30. For example, the MOSFET 42 of circuit 40 is complementary to MOSFET 22 of circuit 30 and the diodes 47, 48 are shown having an opposite conducting direction to the diodes 27, 28. The bias current of circuit 30 is shown derived from a power supply 15a of the line interface circuit while the bias current of circuit 40 is derived from a separate power supply 15b of the line interface circuit. In one alternative, the power supplies 15a and 15b may be the same.

The operation of the circuit 40 is equivalent to the operation of circuit 30 but for negative transients. That is, negative transient voltages appearing at the line interface 16 will be conducted through MOSFET 42 to ground 29.

While the embodiments describe transistors 22, 42 in the form of a MOSFET or IGFET, other types of transistors may be apparent to the person skilled in the art and such transistors are intended to be encompassed herein.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks or modules. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient.

What is claimed is:

1. A protection circuit for protecting at least one solid state circuit at a line interface, the protection circuit comprising:
   at least one first transistor;
   at least one first bias supply for supplying a first bias current to said at least one first transistor; wherein the supplied first bias current is at least a current required to operate said first transistor;
   said first transistor and said first bias supply comprise a first protection circuit providing protection of a first polarity;
   at least one second transistor;
   at least one second bias supply for supplying a second bias current to said at least one second transistor, wherein the supplied bias current is greater than or equal to a bias current required to operate said second transistor;
   said second transistor and said second bias supply comprise a second protection circuit providing protection of a second polarity opposite to said first polarity; and
   at least one further transistor, wherein a gate of said at least one further transistor is derived from between the first said transistor and ground.

2. A protection circuit according to claim 1 wherein said supplied bias current is approximately equal to a bias current required to operate said transistor.

3. A protection circuit according to claim 1 further comprising at least one diode between said first bias supply and said protection circuit.

4. A protection circuit according to claim 3 wherein said at least one diode comprises at least two diodes in series between said first bias supply and said protection circuit.

5. A protection circuit according to claim 1 further comprising at least one diode for providing protection of said second polarity.

6. A protection circuit according to claim 1 wherein the at least one further transistor operates to drive the first said transistor harder during high transient current events.

7. A protection circuit according to claim 1 further comprising at least one further transistor for regulating the bias current.

8. A circuit comprising: at least one line interface circuit; at least one line interface; and at least one protection circuit according to claim 1.

9. The circuit according to claim 8 comprising at least one first protection circuit according to claim 1 providing protection of a first polarity and at least one second protection circuit according to claim 1 providing protection of a second polarity opposite to said first polarity.

10. The circuit according to claim 9 further comprising a plurality of diodes between said line interface and said first and second protection circuits.

11. The circuit according to claim 9 wherein the at least one transistor of said first and second protection circuits each comprise at least one insulated gate field effect transistor.

12. A method for protecting at least one solid state circuit at a line interface, the method comprising:
receiving at least one first transistor; providing a bias to at least one first gate of said at least one first transistor;
receiving a first current transient from said line interface;
conducting said first current transient, of first polarity, to ground through said at least one first transistor;
providing at least one second transistor;
providing a bias to at least one second gate of said at least one second transistor;
receiving a second current transient of an opposite polarity to said first current transient from said line interface;
conducting said second current transient to ground through said at least one second transistor; and
providing at least one further transistor; providing a gate voltage to said at least one further transistor, said gate voltage being derived from between the first said transistor and ground.

13. The method according to claim 12 comprising providing a bias at least equal to a bias required to operate said transistor.

14. The method according to claim 13 comprising deriving said bias from a power supply of a circuit to be protected.

15. The method according to claim 12 further comprising providing at least one diode between said bias supply and said protection circuit.

16. The method according to claim 15 further comprising providing at least two diodes in series between said bias supply and said protection circuit.

17. The method according to claim 12 further comprising: driving the first said transistor harder during high transient current events using said at least one further transistor.

* * * * *